United States Patent
Coward

(10) Patent No.: US 12,460,999 B2
(45) Date of Patent: Nov. 4, 2025

(54) TENSILE TESTING APPARATUS

(71) Applicant: Product Innovation and Engineering, LLC (P.I.N.E.), St. James, MO (US)

(72) Inventor: Connor Lane Coward, Arvada, CO (US)

(73) Assignee: Product Innovation and Engineering, LLC, St. James, MO (US)

( * ) Notice: Subject to any disclaimer, the term of this patent is extended or adjusted under 35 U.S.C. 154(b) by 597 days.

(21) Appl. No.: 17/901,037

(22) Filed: Sep. 1, 2022

(65) Prior Publication Data

US 2023/0075936 A1    Mar. 9, 2023

Related U.S. Application Data

(60) Provisional application No. 63/242,094, filed on Sep. 9, 2021.

(51) Int. Cl.
| | |
|---|---|
| *G01N 3/16* | (2006.01) |
| *G01N 3/04* | (2006.01) |
| *G01N 3/06* | (2006.01) |
| *G01N 3/08* | (2006.01) |

(52) U.S. Cl.
CPC .................. *G01N 3/16* (2013.01); *G01N 3/04* (2013.01); *G01N 3/068* (2013.01); *G01N 3/08* (2013.01); *G01N 2203/0017* (2013.01); *G01N 2203/0206* (2013.01); *G01N 2203/04* (2013.01); *G01N 2203/0447* (2013.01); *G01N 2203/0647* (2013.01)

(58) Field of Classification Search
CPC ... G01N 2201/0245; G01N 2203/0206; G01N 2203/04; G01N 2203/0447; G01N 2201/0464; G01N 3/02; G01N 3/04; G01N 3/08; G01N 3/16; G01N 2203/0028; G01N 2203/0037; G01N 2203/0464–0476; G01N 2203/0647; G01N 3/068; G01N 3/165
See application file for complete search history.

(56) References Cited

U.S. PATENT DOCUMENTS

| | | | | |
|---|---|---|---|---|
| 3,192,766 | A | * | 7/1965 | Keys ........................ G01N 3/02 |
| | | | | 73/834 |
| 6,148,676 | A | * | 11/2000 | Bergs ........................ G01N 3/06 |
| | | | | 73/833 |

(Continued)

FOREIGN PATENT DOCUMENTS

| | | | | |
|---|---|---|---|---|
| CN | 111024515 A | * | 4/2020 | ............... G01N 3/04 |

OTHER PUBLICATIONS

Haque et al, Microscale Materials Testing Using MEMS Actuators, Journal of Microelectromechanical Systems, vol. 10, No. 1, Mar. 2001 (Year: 2001).*

(Continued)

*Primary Examiner* — David L Singer
(74) *Attorney, Agent, or Firm* — Harness, Dickey & Pierce, P.L.C.; Anthony G. Fussner

(57) ABSTRACT

A tensile testing apparatus includes a specimen cartridge and a jaw actuator. The jaw actuator is operable to grip and pull a specimen in tension. The specimen cartridge is operable for holding multiple specimens. The specimen cartridge is rotatable for sequentially presenting specimens to the jaw actuator.

22 Claims, 9 Drawing Sheets

(56) References Cited

U.S. PATENT DOCUMENTS

| | | | |
|---|---|---|---|
| 7,681,459 B1* | 3/2010 | Yang | G01N 3/08 |
| | | | 73/856 |
| 11,002,649 B1* | 5/2021 | Boyce | G01N 3/04 |
| 2002/0053232 A1* | 5/2002 | Axe | G01N 3/08 |
| | | | 73/12.04 |
| 2006/0096385 A1* | 5/2006 | Wenski | G01N 3/32 |
| | | | 73/800 |
| 2020/0166443 A1* | 5/2020 | McCarty, II | G01N 21/88 |

OTHER PUBLICATIONS

Zhang et al, Determination of constitutive relation from miniature tensile test with digital image correlation, Journal of Strain Analysis 2020, vol. 55(3-4) 99-108 (Year: 2020).*

Cinbiz et al, Development of Mechanical Testing Capability for HFEF, Prepared for the U.S. Department of Energy Office of Nuclear Energy Under DOE Idaho Operations Office (Year: 2020).*

* cited by examiner

TENSILE TESTING APPARATUS

CROSS-REFERENCE TO RELATED APPLICATIONS

This patent application claims the benefit of the filing date of provisional patent application Ser. No. 63/242,094, which was filed on 9 Sep. 2021.

STATEMENT REGARDING FEDERALLY SPONSORED RESEARCH OR DEVELOPMENT

Not Applicable.

BACKGROUND

This disclosure pertains to a tensile testing apparatus. More specifically, this disclosure pertains to an autonomous, miniature specimen tensile testing apparatus that is designed to sequentially test multiple miniature specimens of a material or of various materials by applying a tension force to a specimen of the material and observe and record the deformation and reaction of the specimen to the tensile test.

BRIEF SUMMARY

A tensile testing apparatus is constructed to test a large number of material specimens in tension in a time efficient manner. The test specimens are each preformed in a same elongate configuration with enlarged gripping areas at opposite ends that enable each specimen to be acted on by the components of the apparatus to be described. The apparatus may be employed in testing a large number of specimens of one particular material, or a large number of specimens of various types of materials.

The apparatus is comprised of a base structure or base. The base structure supports a specimen holder or a specimen cartridge on the base structure. The base structure also supports a jaw actuator or actuator on the base structure. The base structure includes a control system that controls the operations of the specimen holder, the jaw actuator, cameras, and other operative features of the apparatus.

The specimen holder is a separate component part of the apparatus from the base structure. The specimen holder is removably attachable to the base structure. With the specimen holder removed from the base structure, the specimen holder is operable to receive and hold one or more test specimens on the specimen holder while the specimen holder is separate from the base structure.

The specimen holder is in the form of a specimen cartridge having a circular configuration with multiple slots formed in the cartridge. The multiple slots are spatially arranged in a circular pattern around a periphery of the cartridge. Each slot of the multiple slots has a configuration for receiving a portion of a test specimen in the slot and holding the specimen in the slot. A free end of each specimen projects from the slot and from the periphery of the specimen holder.

After the specimen holder or cartridge has been loaded with test specimens, the specimen holder is attached to the base structure. The specimen holder attached to the base is rotatable on the base. Rotation of the specimen holder on the base rotates the specimens in a circular pattern on the base.

The jaw actuator or actuator on the base is positioned adjacent the specimen holder when the specimen holder is removably attached to the base structure. The actuator is operable to grip a free end of a specimen held by the specimen holder after the specimen holder has been attached to the base and rotation of the specimen holder on the base structure has positioned the free end of the specimen relative to the actuator where the actuator is operable to grip the specimen held by the specimen holder.

The actuator has a first jaw member and a second jaw member. The first jaw member and the second jaw member are operable to engage and grip the free end of the specimen held by the specimen holder moved by rotation of the specimen holder to a position between the first jaw member and the second jaw member. The first jaw member and the second jaw member are operable to grip the free end of the specimen between the first jaw member and the second jaw member and then to pull the specimen in tension from the specimen holder until breakage of the specimen.

A camera is supported on the base structure. The camera is supported on the base structure with the camera directed toward the actuator gripping the free end of the specimen held by the specimen holder. The camera is operable to observe the specimen and record the specimen as the specimen is pulled in tension until breakage of the specimen. The camera is one camera, or a third camera of four cameras supported on the base structure.

A first camera supported on the base structure is operable to observe a specimen held by the specimen holder as an indicia applicator applies indicia to the specimen.

A second camera supported on the base structure is operable to observe and record a speckled pattern applied to a specimen held by the specimen holder by an indicia applicator.

A fourth camera supported on the base structure is operable to observe and record movements of the indicia on the specimen that has been pulled in tension by the actuator until breakage of the specimen.

The features, functions, and advantages of the tensile testing apparatus that have been discussed can be achieved independently in various embodiments of the apparatus or may be combined in yet other embodiments, further details of which can be seen with reference to the following description and drawings.

BRIEF DESCRIPTION OF THE DRAWINGS

Corresponding reference numerals will be used throughout the several figures of the drawings.

DETAILED DESCRIPTION

Figure 1:
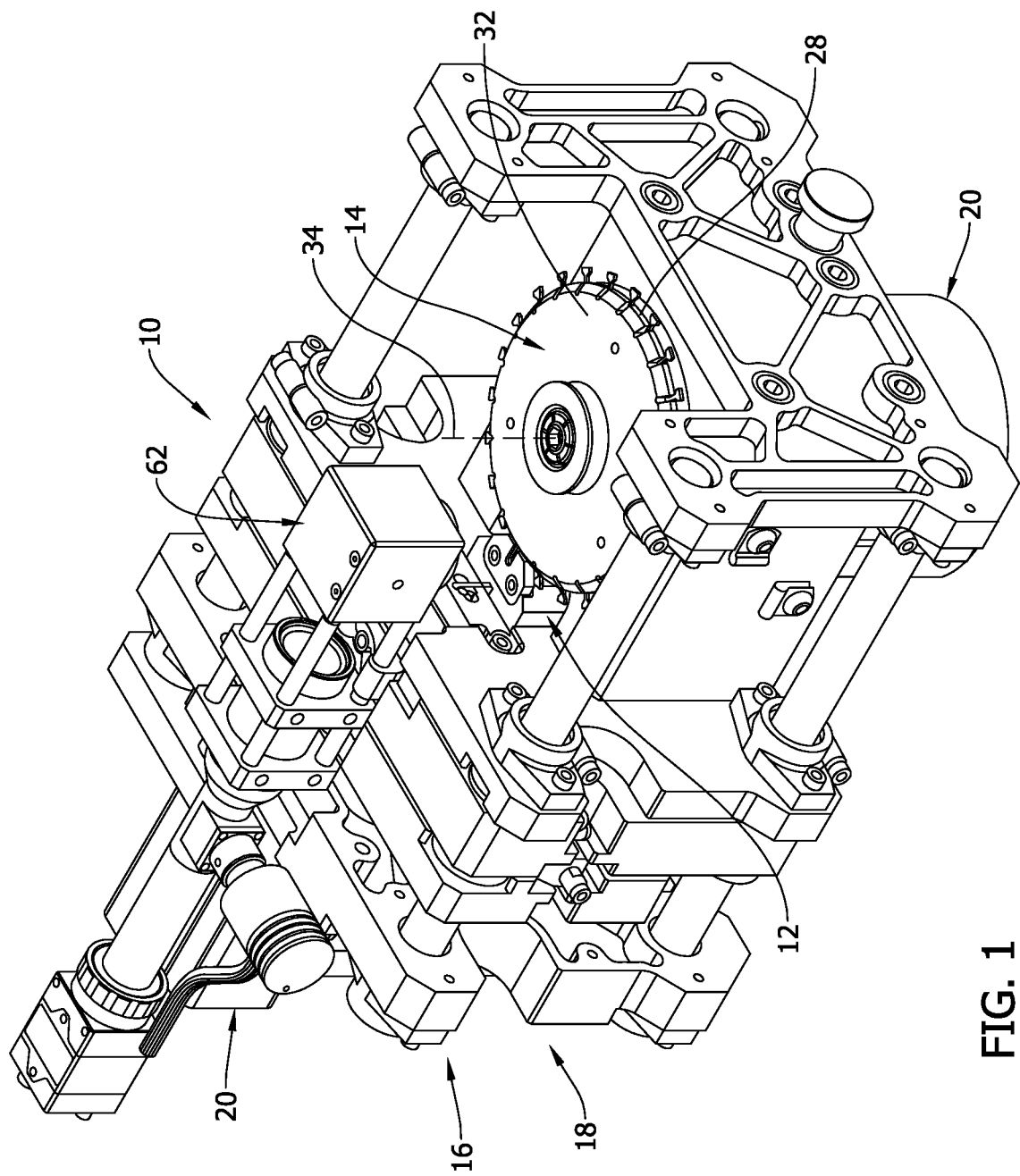
FIG. 1 is a representation of a perspective view of the tensile testing apparatus of this disclosure from one side of the apparatus.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what is presently believe to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

As represented in the drawing figures, the tensile testing apparatus 10 of this disclosure is basically comprised of a jaw actuator or an actuator 12 and a specimen holder or a specimen cartridge 14 that are mounted to a base structure or base 16 of the apparatus. The jaw actuator 12, the specimen cartridge 14 and the base structure 16 are constructed of materials that provide a structural soundness to the component parts of the apparatus 10 that is sufficient for the intended functioning of the apparatus.

The base structure 16 is constructed to support the specimen cartridge 14 relative to the jaw actuator 12. The base structure 16 also supports other operative features of the apparatus such as cameras which will be described. The specimen cartridge 14 or specimen holder is a separate component part of the apparatus that is removably attached to the base structure 16. The specimen holder 14 can be manually gripped and easily raised from and removed from the base structure 16 to load the specimen holder 14 with one or more test specimens of material to be tested. After the specimen holder 14 has been loaded with one or more specimens, the specimen holder 14 can be manually moved downward onto and attached to the base structure 14. In the exemplary embodiment, the specimen holder 14 is constructed with a center shaft that can be inserted into a tubular receiver of the base 16. The control system 18 of the base 16 controls rotation of the receiver and thereby rotates the specimen holder 14. The center shaft can be manually inserted into the receiver and manually pulled out of the receiver without the use of tools. This enables the specimen holder 14 to be easily removed from the base 16, the spent or used specimens can be removed from the specimen holder 14, the specimen holder 14 can then be reloaded with additional specimens to be tested and the reloaded specimen holder 14 attached to the base 16 by insertion of the shaft of the specimen holder 14 into the receiver of the base 16. This quick change of the specimen holder 14 with the base 16 enables time efficient testing of a large number of specimens. The base structure also supports one or more motive devices 20 of the apparatus that control the operations of the jaw actuator and the specimen cartridge to be described. The control system 18 of the base structure 16 is operable to control the motive devices 20 to move the specimen cartridge 14 and jaw actuator 12 horizontally toward and away from each other. The control system 18 of the base structure 16 is also operable to control rotation the specimen cartridge 14 on the base structure 16.

Rotation of the specimen cartridge 14 on the base structure 16 is controlled by the control system 18 of the base structure 16 to rotate the specimen cartridge 14 in indexed, increments of rotation or segments of rotation. The segments of rotation are equal to the number of material specimens supported by the specimen cartridge 14, and the lengths of the segments of rotation are equal to the distance between adjacent specimens supported on the specimen cartridge 14. The segmented rotation of the specimen cartridge 14 controlled by the control system 18 presents one material specimen at a time to the jaw actuator 12. The controlled rotation of the specimen cartridge 14 presents a specimen positioned relative to or opposite the opened jaw actuator 12. The jaw actuator 12 is then controlled to move toward the presented specimen and grip the specimen. The jaw actuator 12 and the specimen cartridge 14 are then controlled to conduct a tensile test of the one material specimen presented to the jaw actuator 12 by the controlled movement of the jaw actuator 12 away from the specimen cartridge 14. The tensile test could be conducted to stretch the specimen to a certain degree, or to stretch the specimen to breakage. When the tensile test is completed, the jaw actuator 12 is controlled by the control system 18 to release the tested material specimen or the remnant of the specimen and the specimen cartridge 14 is controlled by the control system 18 to rotate in one segment of rotation to present a next, subsequent material specimen to the jaw actuator 12 for testing.

As set forth earlier, the base structure 16 supports the specimen cartridge 14 with the specimen cartridge 14 being removably attached to the base structure 16. A specimen cartridge attached to the base structure 16 has been loaded with a plurality of material specimens desired to be tested by the apparatus 10. The specimen cartridge 14 attached to the base structure 16 can be removed when the material specimens held by the specimen cartridge 14 have been used or completed their testing. The removed specimen cartridge 14 can have the tested material specimens removed from the cartridge and replaced with a new, plurality of material specimens to be tested by the apparatus 10. The specimen cartridge 14 can be removed from the base structure 16 and the used or tested specimens can then be removed from the specimen cartridge 14. The removed cartridge 14 can be reloaded with new specimens at a separate location from the apparatus 10. The specimen cartridge 14 being removable from the base structure 16 also enables a first, used specimen cartridge 14 to be removed from the base structure 16 and the immediate attachment of a second, preloaded specimen cartridge 14 to the base structure 16 to replace the first, used specimen cartridge removed. This significantly improves time efficiency in testing specimens. The specimen cartridge 14 being removable from the base structure 16 also enables several specimen cartridges 14 to be preloaded with test specimens for immediate replacement of a used specimen cartridge 14. This also improves time efficiency in testing specimens.

As represented in FIG. 1, the jaw actuator 12 is positioned adjacent the specimen cartridge 14 on the base structure 16. The jaw actuator 12 is controlled by the control system 18 of the base structure 16 to move horizontally toward and away from the specimen cartridge 14, and/or to move vertically downward toward the top of the specimen cartridge 14 and vertically upward away from the top of the specimen cartridge 14. The jaw actuator 12 could also be controlled to move vertically downward away from the bottom of the specimen cartridge 14 and vertically upward toward the bottom of the specimen cartridge 14.

The jaw actuator 12 is comprised of a first jaw member 22 and a second jaw member 24. The control system 18 of the base structure 16 controls the operation of the jaw actuator 12 to move the first jaw member 22 and the second jaw member 24 together relative to the base structure 16 and the specimen cartridge 14. The first jaw member 22 and second jaw member 24 are position horizontally opposite each other on the jaw actuator 12 with a horizontal spacing 26 between the first jaw member 22 and the second jaw member 24. The horizontal spacing between the first jaw member 22 and the second jaw member 24 is dimensioned to receive a free end of a specimen moved by the specimen cartridge 14 to a position adjacent the spacing 26 between the first jaw member 22 and the second jaw member 24. In other embodiments of the apparatus 10, the first jaw member 22 and the second jaw member 24 could be positioned on the actuator 12 spaced vertically opposite each other with a vertical space between the first jaw member and the second jaw member dimensioned to receive a free end of a specimen in the vertical space.

In the exemplary embodiment, the jaw actuator 12 is operable to move the first jaw member 22 and the second jaw member 24 together, horizontally away from the specimen cartridge 14 by a small distance. This provides clearance for the specimen cartridge 14. As a specimen cartridge 14 is attached to the base structure 16, the jaw actuator 12 and the first 22 and second 24 jaw members have been moved together, horizontally to a position adjacent the area of the base structure 16 where the specimen cartridge 14 is attached to the base structure 16. This positioning of the jaw actuator 12 provides ample clearance and access for the specimen cartridge 14 to be attached to the base structure 16. The jaw actuator 12 is then controlled to move the first jaw member 22 and the second jaw member 24 horizontally apart, creating a horizontal spacing 26 between the first jaw member 22 and the second jaw member 24. The specimen cartridge 14 holds a specimen adjacent the actuator jaw 12 with the specimen projecting from the periphery of the specimen cartridge 14 to a free end of the specimen. The free end of the specimen is held by the specimen cartridge 14 at a position directly adjacent the horizontal space between the first jaw member 22 and the second jaw member 24. The jaw actuator 12 is then operated by the control system 18 of the base structure 16 to move horizontally toward the specimen cartridge 14 until the first jaw member 22 and the second jaw member 24 are positioned on opposite sides of the free end of the specimen positioned or presented at the jaw actuator 12 by the specimen cartridge 14. The jaw actuator 12 is operable to selectively move the first jaw member 22 and the second jaw member 24 together, closing the horizontal spacing 26 between the first jaw member and the second jaw member and gripping the free end of the specimen between the jaw members. The jaw actuator 12 could be controlled to move the first jaw member 22 towards the second jaw member 24 while the second jaw member 24 remains stationary. Alternatively, operation of the jaw actuator 12 could move the second jaw member 24 toward the first jaw member 22 while the first jaw member remains stationary. Still further, the jaw actuator 12 could be operable to move the first jaw member 22 and the second jaw member 24 together simultaneously. Alternatively, the first jaw member 22 could be positioned above the second jaw member 24 with a vertical spacing between the first jaw member and the second jaw member. The jaw actuator 12 would then be operable to selectively move the first jaw member 22 and the second jaw member 24 together, closing the vertical spacing between the first jaw member and the second jaw member and gripping the free end of the specimen between the jaw members.

The jaw actuator 12 is operable to selectively move the first jaw member 22 and the second jaw member 24 together, horizontally toward and away from the specimen cartridge 14. The jaw actuator 12 is operable to selectively move the first jaw member 22 and the second jaw member 24 together between first positions of the jaw members where the jaw members are positioned on opposite sides of a free end of a specimen held by the specimen cartridge 14, to second positions of the jaw members where the jaw members that have gripped the free end of the specimen are moved away from the specimen cartridge to pull the gripped specimen and apply a tensile test to the gripped specimen.

The specimen cartridge or cartridge 14 has a cylindrical configuration defined by a cylindrical peripheral surface or wall 28 of the cartridge 14. The cartridge 14 also has a circular top surface 32 defined by the cylindrical configuration of the peripheral surface 28 of the cartridge. The cartridge 14 is rotatable on the base 16 around a center axis 34 of the cartridge 14 relative to the base and relative to the jaw actuator 12. As stated earlier, the cartridge 14 is controlled by the control system 18 of the base structure 16 or is operable to rotate in segments of rotation relative to the jaw actuator 12. The cartridge 14 is operable to rotate in indexed or segment movements between a number of segments of rotation that equal the number of specimens held by the cartridge 14.

Figure 7:
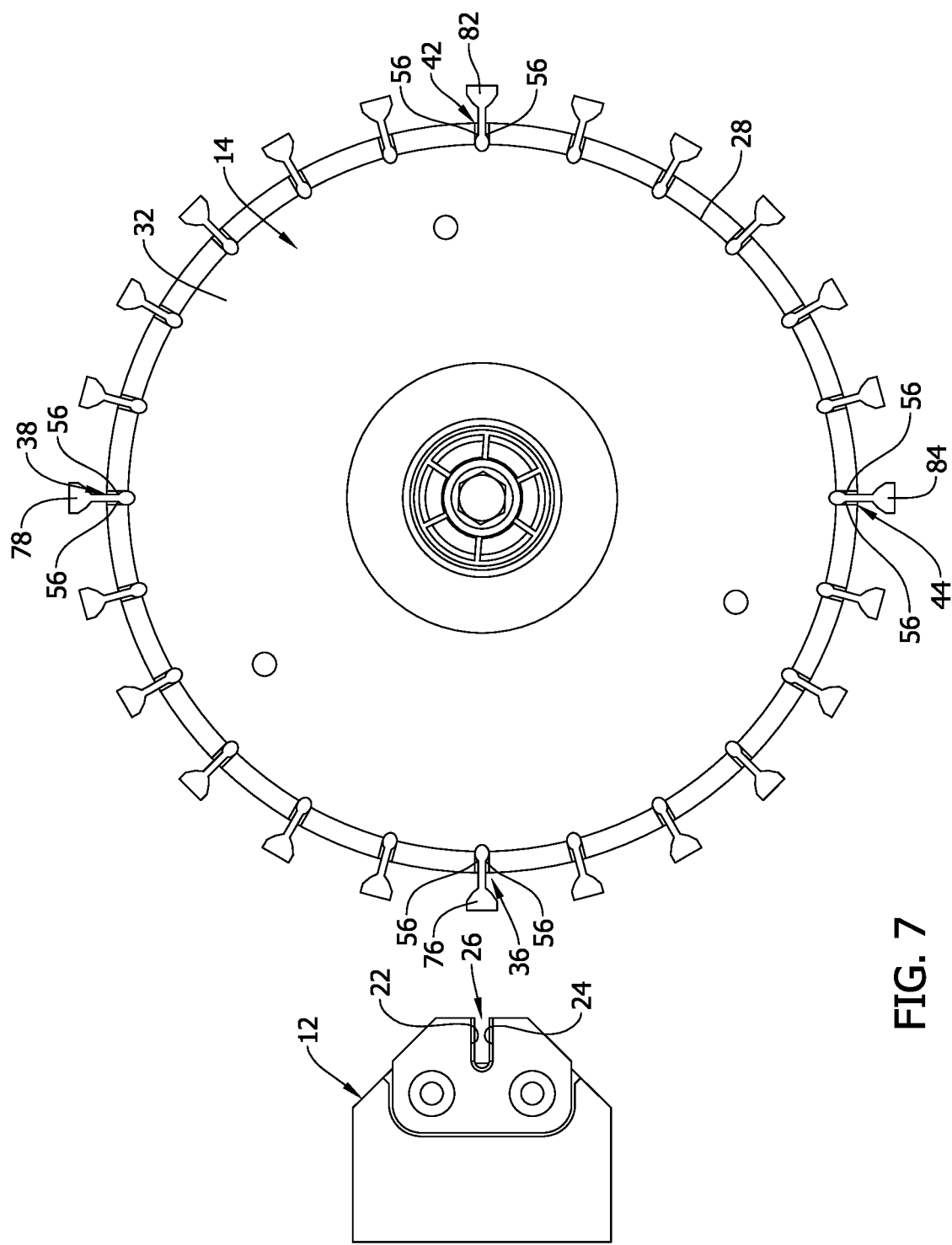
FIG. 7 is a representation of a top plan view of a jaw actuator and specimen cartridge of the apparatus.
Figure 8:
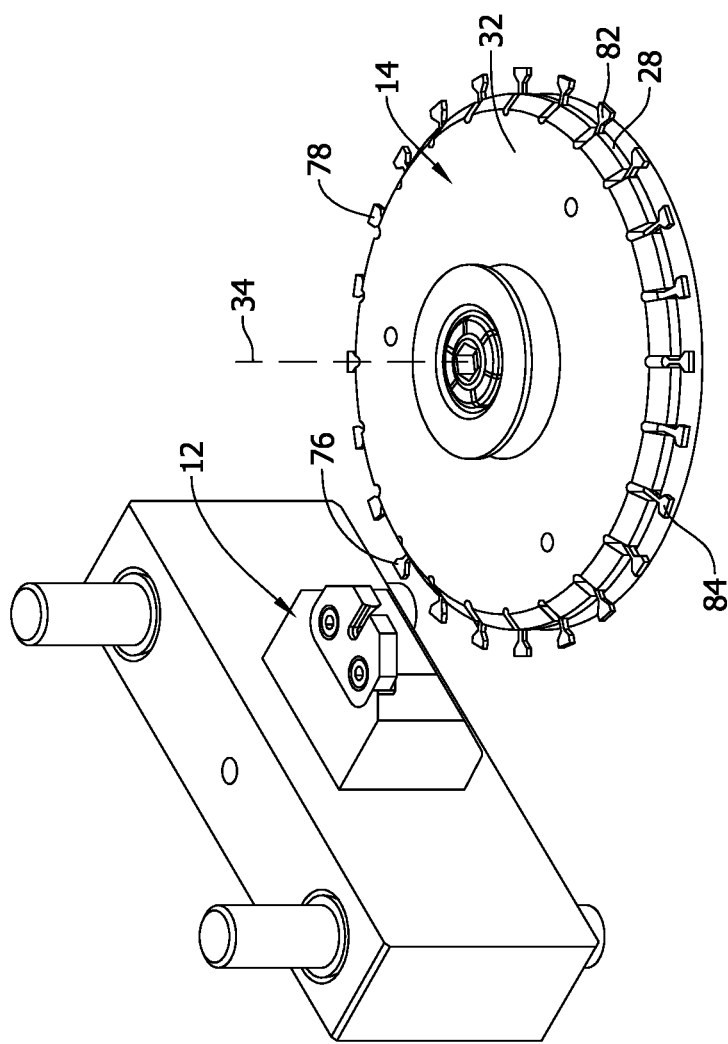
FIG. 8 is a representation of a perspective view of the jaw actuator and specimen cartridge of FIG. 7.
Figure 9:
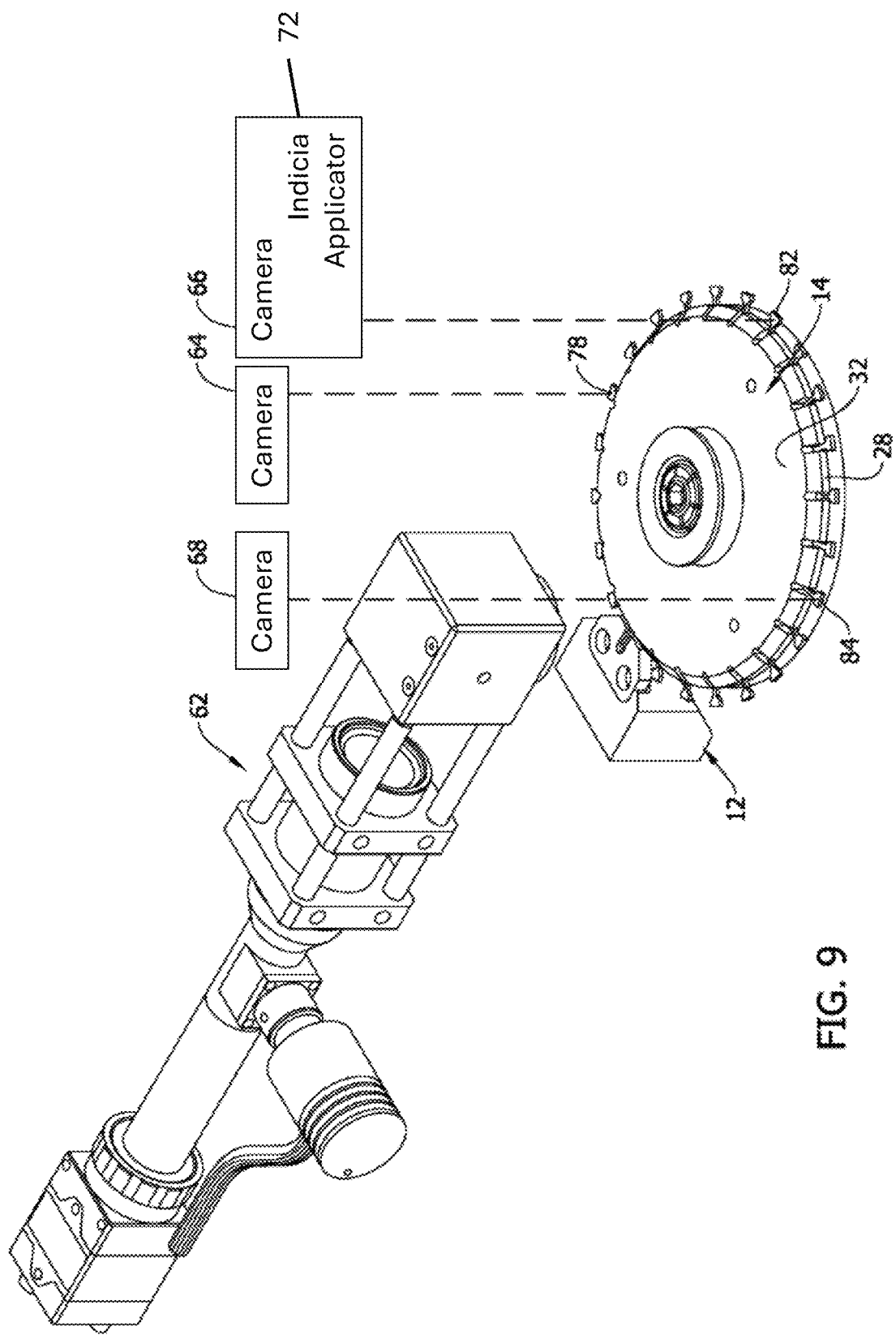
FIG. 9 is a representation of a perspective view of a camera assembly of the apparatus relative to the jaw actuator and specimen cartridge of the apparatus.

A plurality of slots are provided in the cartridge 14. As represented in FIGS. 7-9, the plurality of slots includes twenty-four equally spaced slots around the peripheral surface 28 of the cartridge 14. Only four slots 36, 38, 42, 44 of the twenty-four slots are labelled in the drawing figures. In other embodiments of the cartridge 14, there could be more than twenty-four slots or fewer than twenty-four slots. The slots are spatially positioned around the peripheral wall 28 of the cartridge 14. There are equal spacings between the slots. Each slot passes through the top surface 32 of the cartridge 14 and through a portion of the peripheral wall 28 of a cartridge. Each slot is accessible through the top surface 32 of the cartridge 14 and is configured for receiving a first end of a specimen where the specimen has a length between a first end of the specimen and a second end or free end of the specimen. Each slot is configured to receive the first end of the specimen through the slot in the top surface 32 of the cartridge 14. Each slot is also configured to enable the specimen to be positioned in the slot with the first end of the specimen in the slot and the length of the specimen extending through and from the peripheral wall 28 of the cartridge 14 to the second end or free end of the specimen positioned outside the slot.

As represented in FIG. 7, specimen engagement devices 56 are positioned in each of the slots 36, 38, 42, 44 and inside the specimen cartridge 14. The specimen engagement devices 56 function as grippers or graspers that are operable to grip and hold the first end of a specimen positioned in the slots 36, 38, 42, 44. The specimen engagement devices 56 could be mechanical devices that are operated by the control system 18 of the base structure 16 to move and engage the specimens. The specimen engagement devices could be stationary structures having complementary shapes to the shapes of the first ends of the specimens to receive the first ends of the specimens inserted into the structures and hold the first ends against movement from the structures. The specimen engagement devices 56 are also operable to release the first end of the specimen gripped by the specimen engagement device 56 inside the slot after the specimen has been tested.

Figure 2:
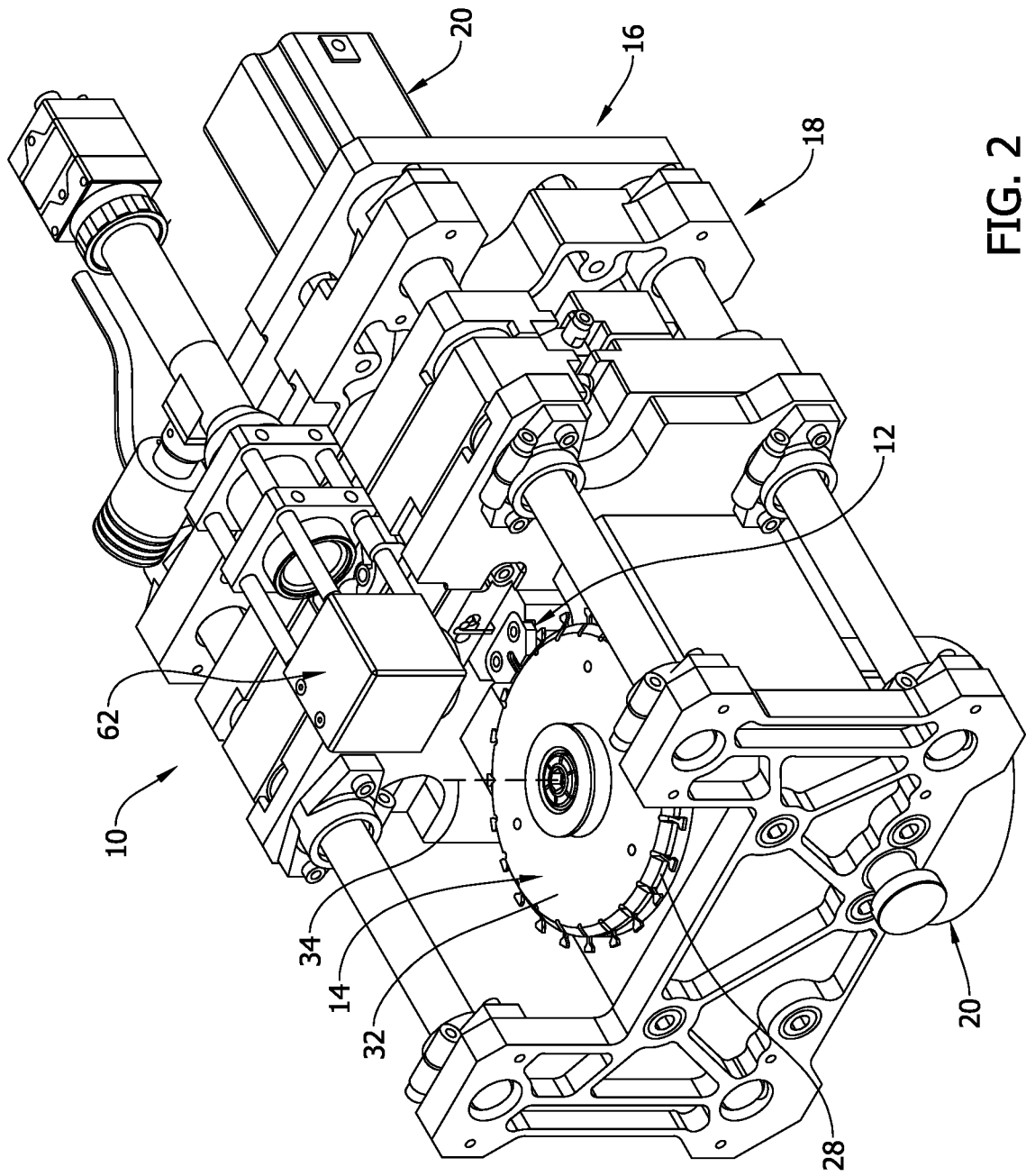
FIG. 2 is a representation of a perspective view of the apparatus from a second, opposite side of the apparatus from that represented in FIG. 1.
Figure 3:
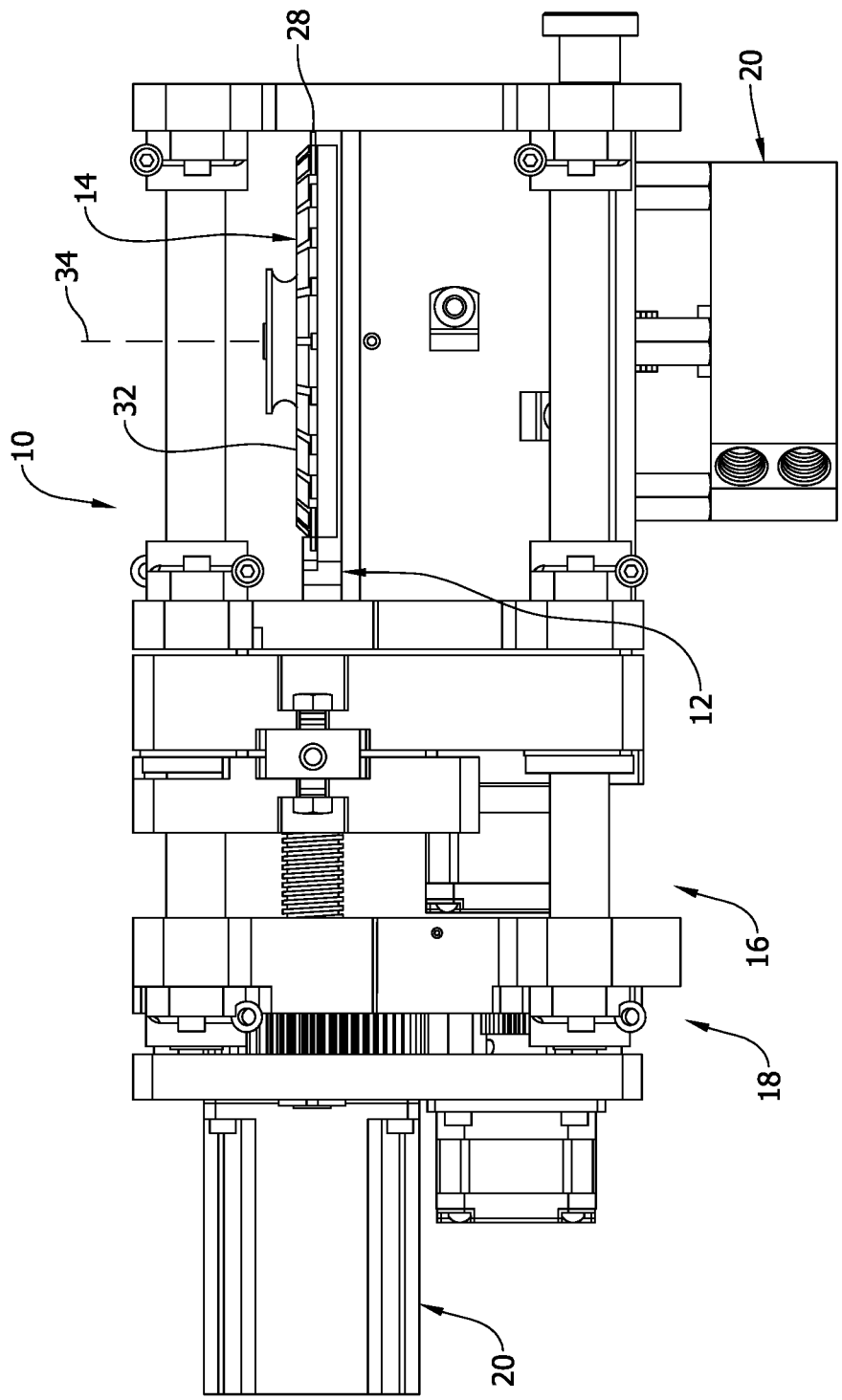
FIG. 3 is a representation of a side elevation view of the apparatus of FIG. 1.
Figure 4:
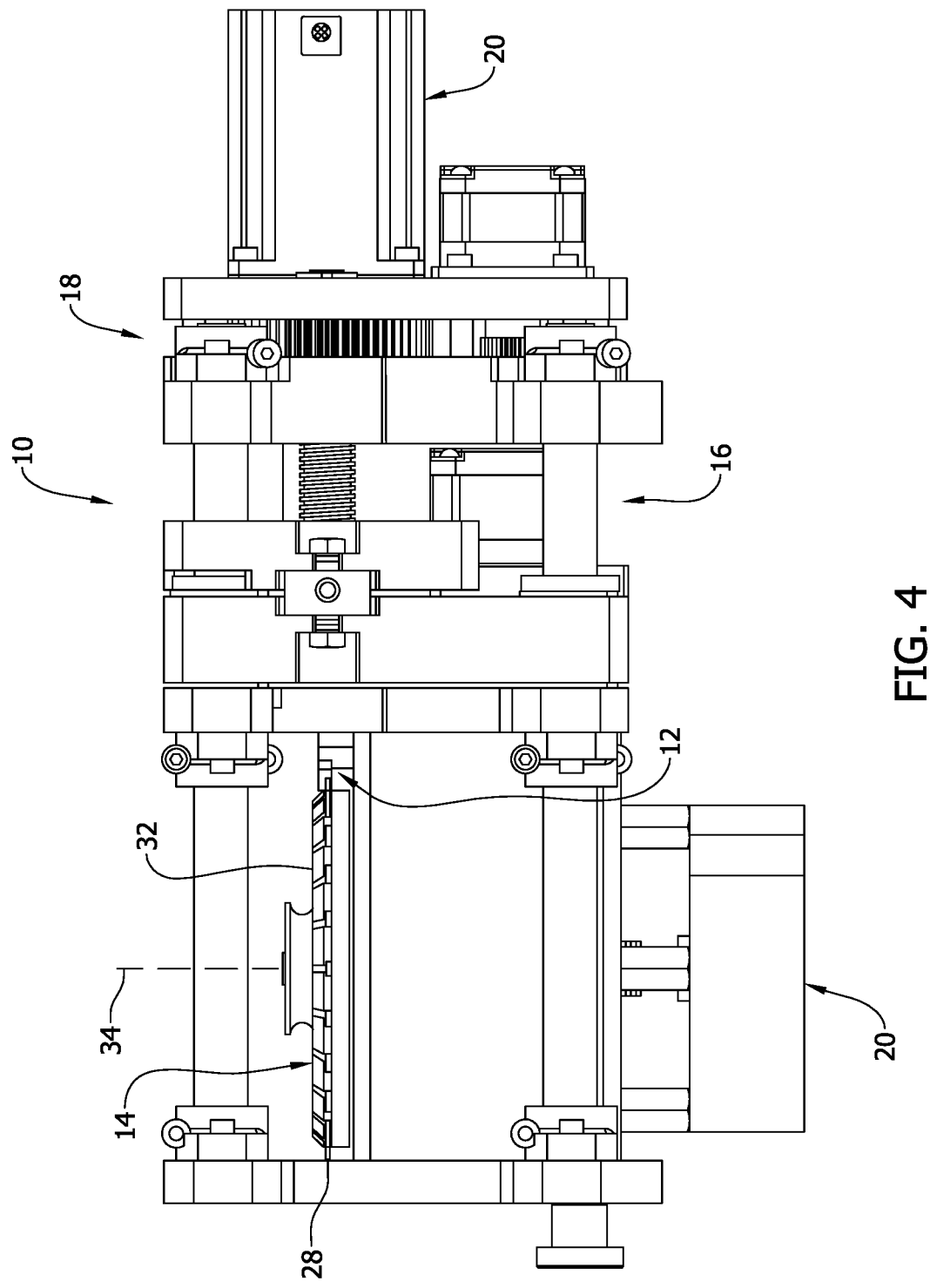
FIG. 4 is a representation of a side elevation view of the apparatus of FIG. 2.
Figure 5:
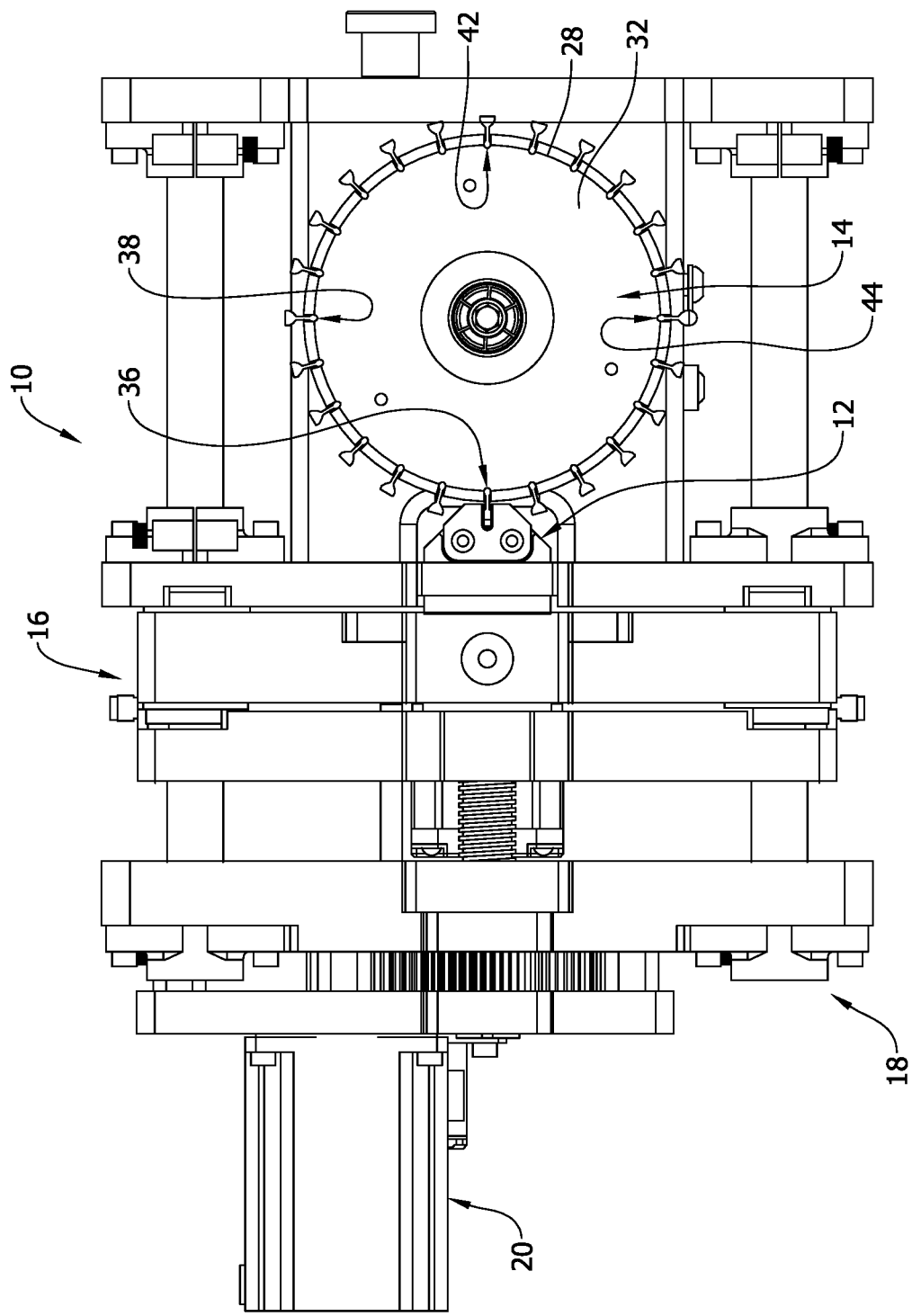
FIG. 5 is a representation of a top plan view of the apparatus.
Figure 6:
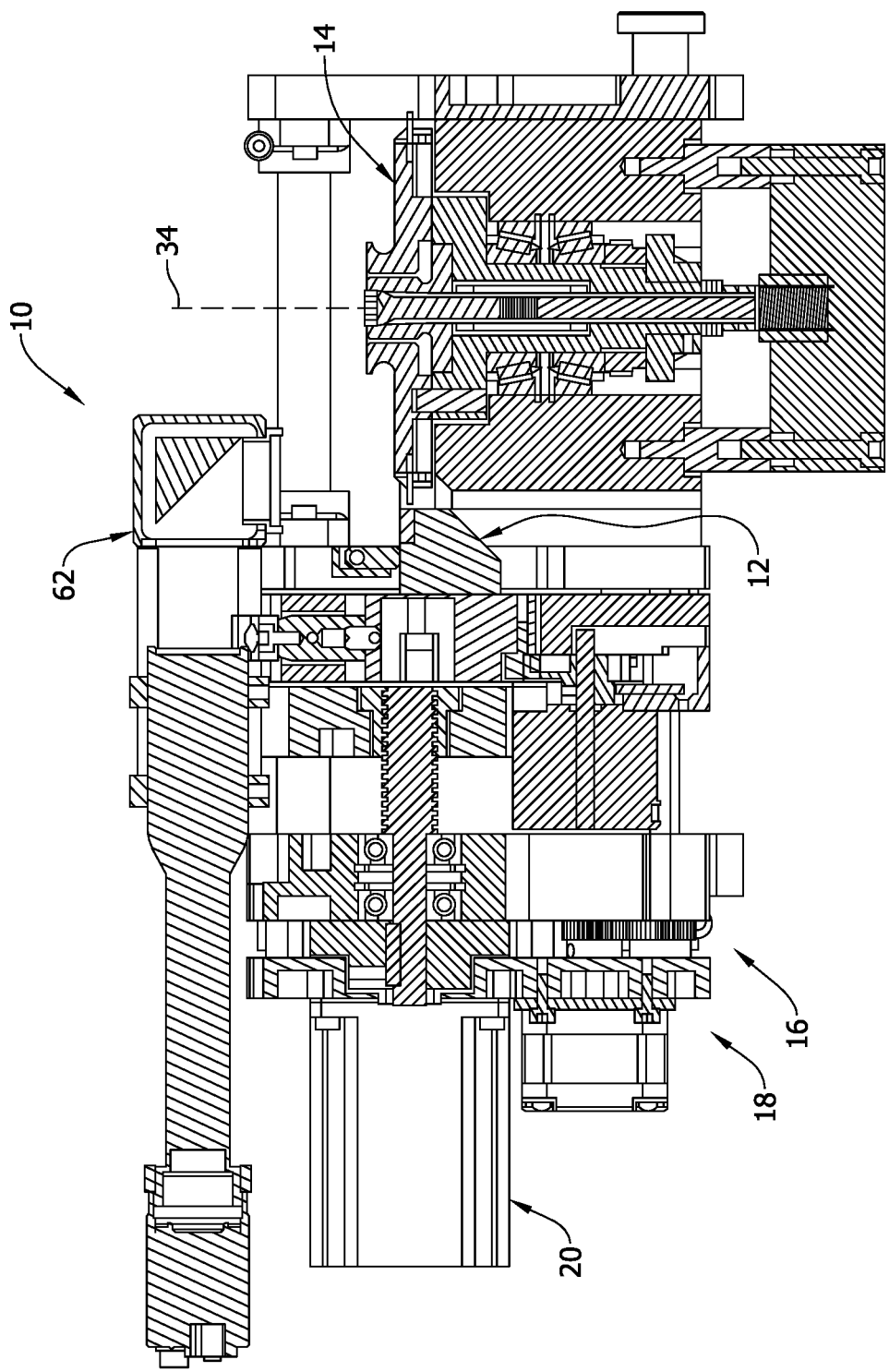
FIG. 6 is a representation of an elevation, cross section view of the apparatus.

The tensile testing apparatus 10 is also comprised of four camera assemblies 62, 64, 66, 68. The operation of the cameras is controlled by the control system 18 of the apparatus. Only one of the camera assemblies 62 is represented on the apparatus 10 in FIGS. 1, 2 and 6. The first camera assembly 62 is represented positioned relative to the jaw actuator 12 and cartridge 14, and above the first slot 36 in FIG. 9. The lens of the camera assembly 62 is directed downward toward the specimen held by the specimen engaging devices 56 of the cartridge 14 and toward the first 22 and second 24 jaw members. The second 64, third 66 and fourth 68 camera assemblies are represented schematically by rectangles in FIG. 9. The apparatus 10 could include more than four camera assemblies, or fewer than four camera assemblies. The apparatus could comprise a camera positioned stationary above each of the positions of the slots in the specimen cartridge 14. As represented in FIG. 9, the four cameras 62, 64, 66, 68 are positioned stationary above the respective four slots 36, 38, 42, 44. Each of the cameras 62, 64, 66, 68 is a high precision camera such as a digital image correlation camera or an equivalent type of camera device that is capable of viewing or sensing minute details of a specimen held in each slot 36, 38, 42, 44 of the specimen cartridge 14.

At the location of the first camera 62, there could be additional cameras to the one camera 62 shown. For example, there could be multiple cameras supported on the base structure 16 at positions around the jaw actuator 12. The cameras could provide a view from above the specimen in the jaw actuator 12, in addition to views of the specimen from around the specimen to monitor the specimen from various angles as the specimen is tested.

In operation of the apparatus 10 represented in FIGS. 7-9, in this example four specimens 76, 78, 82, 84 of a material to be tested or of different materials to be tested are loaded into each of the slots 36, 38, 42, 44, respectively. In actual use of the apparatus, all the slots of the cartridge 14 would be filled with specimens. The specimens 76, 78, 82, 84 are positioned in the slots with the first ends of the specimens positioned in the slots and gripped by the specimen engagement devices 56, and with the lengths of the specimens extending from the slots outside the peripheral surface 28 of the cartridge 14. As represented in FIGS. 7, 8 and 9, the first specimen 76 is positioned in the first slot 36, the second specimen 78 is positioned in the second slot 38, the third specimen 82 is positioned in the third slot 42 and the fourth specimen 84 is positioned in the fourth slot 44.

The tensile testing apparatus 10 also includes an indicia marker or applicator device 72 represented schematically by a rectangle in FIG. 9. As represented in FIG. 9, the indicia applicator device 72 is positioned adjacent the third camera 66 and above the third slot 42. The indicia applicator 72 is positioned stationary directly above the third slot 42 where the applicator 72 is operable to apply indicia in a speckled pattern, or other equivalent position indicating markings to a specimen 82 held in the third slot 42. The indicia are applied to the specimen 82 by the applicator 72 primarily along the length of the specimen that extends from the third slot 42 and from the peripheral wall 26 of the specimen cartridge 14. The indicia could be applied along the entire length of the specimen. The third camera 66 observes and records the application of the indicia. The indicia applied to the length of the specimen 82 by the indicia applicator 72 is used to observe the stretching and relative movements of portions of the specimen length during the testing of the specimen, and observe stretching and other deformations of the specimen length that have occurred during and after the testing of the specimen.

The indicia applicator 72 is operated to apply indicia in a speckled pattern to the third specimen 82 in the third slot 42. The indicia applicator 72 is operable to apply the indicia into the third slot 42 and on the first end of the third specimen 82, along the length of the third specimen 82 to the second end of the third specimen 82. The third camera 66 positioned above the third slot 42 monitors the application of the indicia to the third specimen 82.

The fourth camera 68 observes the fourth specimen 84 in the fourth slot 44 that has previously had its indicia markings applied to the specimen. The fourth camera 68 records the pattern of the indicia applied to the fourth specimen 84 and the relative positions of portions of the pattern.

The first camera 62 is positioned above the first slot 36 and the first specimen 76 in the first slot 36. The first camera 62 observes the first specimen 76 as the second end or free end of the specimen is gripped by the first jaw member 22 and second jaw member 24 of the jaw actuator 12, and as the first specimen 76 is subjected to tensile force produced by the jaw actuator 12. The first camera 62 records the first specimen 76 as the specimen is tested by being stretched by the jaw actuator 12. The specimen 76 could be tested until breakage of the specimen. The first camera 62 records the relative movements of the indicia applied to the first specimen 76 as the first specimen is subjected to tensile force by the jaw actuator 12 and stretched, or stretched and until the breakage of the first specimen.

The second camera 64 observes and records the image of the second specimen 78 after the specimen has been stretched, or stretched and broken. The second camera 64 observes the positions of the speckled pattern on the second specimen 78 and together with the fourth camera 68 produces a pattern of movements of the speckled pattern on the second specimen 78 resulting from the specimen being stretched by the jaw actuator 12 until breakage of the specimen. The second slot 38 holding the second specimen 78 can dispense the broken first end of the specimen from the slot making the slot available for the loading of a further specimen in the slot.

In place of or in addition to the cameras and the other devices supported on the base structure 16 and positioned around the specimen cartridge 14 described above, there could be other various different types of testing devices supported by the base structure 16. For example, various different types of laser testing devices such as laser displacement sensors or other geometry measurement sensors that detect changes in the surface of the specimen as the specimen is tested could be supported by the base structure 16 at positions around the specimen cartridge 14. More than one sensor and more than one type of sensor, for example a combination of a camera and a geometry sensor could be positioned at locations around the specimen cartridge 14.

The tensile testing apparatus 10 described above is an autonomous miniature tensile testing apparatus that provides clear views of the specimens by cameras as the specimens are moved through four stages of testing. The apparatus 10 enables simultaneous movement of the four specimens to the jaw actuator 12 and then from the jaw actuator. As the specimen cartridge 14 rotates and moves specimens in a horizontal plane to the jaw members 22, 24 of the jaw actuator 12, the specimens are observed by the cameras 62, 64, 66, 68 without obstruction in the four slots 36, 38, 42, 44.

In view of the above, it will be seen that the several objects and advantages of the present invention have been achieved and other advantageous results have been obtained.

As various changes could be made in the above constructions of the tensile testing apparatus without departing from the scope of the invention, it is intended that all matter contained in the above description or shown in the accompanying drawings shall be interpreted as illustrative and not in a limiting sense.

The invention claimed is:

1. A tensile testing apparatus comprising:
    a base structure;
    a specimen holder, the specimen holder being separate from the base structure, the specimen holder being removably attachable to and rotatable relative to the base structure, the specimen holder being operable to hold multiple specimens on the specimen holder when the specimen holder is removed from the base structure and is separated from the base structure and to hold the multiple specimens on the specimen holder as the specimen holder is attached to the base structure and after the specimen holder has been attached to the base structure; and
    an actuator on the base structure, the actuator being operable to grip a corresponding specimen of the multiple specimens held by the specimen holder after the specimen holder has been attached to the base structure;
    wherein the specimen holder is removable and separatable from the base structure such that the specimen holder can be loaded independently with the multiple specimens and then attached to the base structure for automated sequential tensile testing of the multiple specimens as the multiple specimens are simultaneously moved through different stages of testing when the specimen holder is rotated relative to the base structure.

2. The tensile testing apparatus of claim 1,
    wherein the base structure is operable to rotatingly move the specimen holder attached to the base structure cartridge in indexed or segment movements to thereby move the corresponding specimen held by the specimen holder toward the actuator and position the corresponding specimen held by the specimen holder adjacent the actuator with the actuator being operable to grip the corresponding specimen held by the specimen holder.

3. The tensile testing apparatus of claim 2,
    wherein the actuator is movable away from the specimen holder to pull the corresponding specimen held by the specimen holder and apply a tensile test to the specimen.

4. The tensile testing apparatus of claim 3, further comprising a camera supported on the base structure with the camera directed toward the corresponding specimen held by the specimen holder and with the camera directed toward the actuator.

5. The tensile testing apparatus of claim 4, wherein:
    the camera on the base structure is a first camera on the base structure; and
    the tensile testing apparatus further comprises a second camera supported on the base structure with the second camera directed toward the corresponding specimen held by the specimen holder prior to the corresponding specimen held by the specimen holder being moved toward the actuator;
    whereby first and second specimens of the multiple specimens are observable by the first and second cameras without obstruction as the multiple specimens are simultaneously moved through different simultaneous stages of testing when the specimen holder is rotated relative to the base structure in indexed or segment movements.

6. The tensile testing apparatus of claim 1, wherein:
    the specimen holder is configured to hold a plurality of specimens on the specimen holder when the specimen holder is removed from the base structure and is separated from the base structure; and
    the specimen holder is configured to hold the plurality of specimens on the specimen holder as the specimen holder is attached to the base structure and after the specimen holder has been attached to the base structure.

7. The tensile testing apparatus of claim 6, wherein the base structure is operable to rotatingly move the specimen holder attached to the base structure in indexed or segment movements to thereby simultaneously move the plurality of specimens held by the specimen holder and position one specimen of the plurality of specimens held by the specimen holder adjacent the where the actuator is operable to grip the one specimen of the plurality of specimens held by the specimen holder.

8. The tensile testing apparatus of claim 7, wherein:
    the actuator is movable away from the specimen holder to pull the one specimen held by the specimen holder and apply a tensile test to the one specimen;
    the tensile testing apparatus further comprises multiple cameras supported on the base structure and positioned around the specimen holder for different simultaneous stages of the tensile testing including indicia application, pattern recording, tension observation, and post-failure analysis; and
    corresponding specimens of the plurality of specimens are observable by the multiple cameras without obstruction as the plurality of specimens are simultaneously moved through the different simultaneous stages of testing when the specimen holder is rotated relative to the base structure in indexed or segment movements.

9. The tensile testing apparatus of claim 1, further comprising:
    a specimen engagement device on the specimen holder, the specimen engagement device being operable to engage a specimen and hold the specimen on the specimen holder with a free end of the specimen projecting from the specimen holder; and
    wherein the actuator is operable to grip the free end of the specimen projecting from the specimen holder and move away from the specimen holder to thereby pull the gripped specimen and apply a tensile test to the gripped specimen.

10. The tensile testing apparatus of claim 1, wherein:
    the specimen holder comprises a specimen cartridge having a circular configuration with multiple slots in the specimen cartridge;
    the multiple slots are spatially arranged in a circular pattern around a periphery of the specimen cartridge;
    each slot of the multiple slots has a configuration for receiving and holding a specimen in the slot such that a free end of the specimen projects from the specimen cartridge; and
    the specimen cartridge is rotatable for sequentially presenting the multiple specimens held in the multiple slots to the actuator.

11. The tensile testing apparatus of claim 10, wherein:
the actuator comprises a jaw actuator on the base structure and positioned adjacent the specimen cartridge when the specimen cartridge is removably attached to the base structure; and
the jaw actuator includes first and second jaw members operable to:
grip the free end of the specimen being held in the slot of the specimen cartridge that has been moved by rotation of the specimen cartridge into a position adjacent the first and second jaw members; and
pull the specimen in tension.

12. The tensile testing apparatus of claim 10, further comprising a camera positioned stationary adjacent a slot in the specimen cartridge, wherein the camera is operable to observe and record characteristics of the specimen being held in the slot of the specimen cartridge that is adjacent to the camera.

13. The tensile testing apparatus of claim 10, further comprising multiple cameras supported on the base structure and positioned around the specimen cartridge for different simultaneous stages of tensile testing of the multiple specimens including indicia application, pattern recording, tension observation, and post-failure analysis, wherein the corresponding specimens of the multiple specimens are observable by the multiple cameras without obstruction as the multiple specimens are simultaneously moved through the different simultaneous stages of tensile testing when the specimen cartridge is rotated relative to the base structure in indexed or segment movements, whereby the tensile testing apparatus is configured to be autonomously operable for sequentially testing multiple specimens by applying a tension force to a corresponding specimen and observing and recording deformation and reaction of the multiple specimens to the tensile test via the multiple cameras.

14. The tensile testing apparatus of claim 10, wherein the tensile testing apparatus further comprises one or more cameras, laser displacement sensors, and/or geometry measurement sensors supported on the base structure and positioned around the specimen cartridge for different simultaneous stages of the tensile testing of the multiple specimens including indicia application, pattern recording, tension observation, and post-failure analysis, the multiple specimens are observable by the one or more cameras, laser displacement sensors, and/or geometry measurement sensors as the multiple specimens are simultaneously moved through the different simultaneous stages of tensile testing when the specimen cartridge is rotated relative to the base structure in indexed or segment movements, whereby the tensile testing apparatus is configured to be autonomously operable for sequentially testing multiple specimens by applying a tension force to a corresponding specimen and observing and recording deformation and reaction of the multiple specimens to the tensile test via the one or more cameras, laser displacement sensors, and/or geometry measurement sensors.

15. The tensile testing apparatus of claim 10, wherein the tensile testing apparatus further comprises multiple laser displacement sensors supported on the base structure and positioned around the specimen cartridge to measure specimen dimensions before testing and fracture surface cross sectional area after testing.

16. The tensile testing apparatus of claim 10, wherein the specimen cartridge is removably attachable to the base structure thereby enabling the specimen cartridge to be removed and separated from the base structure for independently loading multiple specimens into the multiple slots of the specimen cartridge and thereafter to be attached to the base structure after the specimen cartridge has been loaded with multiple specimens in the multiple slots of the specimen cartridge for automated sequential testing of the multiple specimens.

17. The tensile testing apparatus of claim 10, wherein the base structure is operable to rotate the specimen cartridge when removably attached to the base structure to thereby:
simultaneously rotate the multiple specimens held in the multiple slots of the specimen cartridge relative to the actuator; and
sequentially position the multiple specimens held in the multiple slots of the specimen cartridge relative to the actuator at which the actuator is operable to grip and pull a corresponding specimen of the multiple specimens held in the multiple slots of the specimen cartridge as the specimen cartridge is rotated relative to the actuator.

18. The tensile testing apparatus of claim 10, further comprising:
a first camera adjacent the specimen cartridge and configured to be operable to observe a specimen as an indicia applicator applies indicia to the specimen;
a second camera adjacent the specimen cartridge and configured to be operable to observe and record a speckled pattern applied to a specimen by the indicia applicator;
a third camera adjacent the specimen cartridge and configured to be operable to observe and record a specimen as the specimen is pulled in tension by the actuator; and
a fourth camera adjacent the specimen cartridge and configured to be operable to observe and record movements of indicia on a specimen that has been pulled in tension by the actuator;
whereby the tensile testing apparatus is configured to be autonomously operable for sequentially testing multiple specimens by applying a tension force to a corresponding specimen and observing and recording deformation and reaction of the multiple specimens to the tensile test via the first, second, third, and fourth cameras.

19. The tensile testing apparatus of claim 1, wherein:
the actuator comprises a jaw actuator on the base structure and positioned adjacent the specimen cartridge when the specimen cartridge is removably attached to the base structure; and
the jaw actuator includes first and second jaw members operable to:
grip the specimen being held in the slot of the specimen cartridge that has been moved by rotation of the specimen cartridge into a position adjacent the first and second jaw members; and
pull the specimen in tension.

20. The tensile testing apparatus of claim 1, wherein the tensile testing apparatus further comprises one or more cameras, laser displacement sensors, and/or geometry measurement sensors supported on the base structure and positioned around the specimen holder for different simultaneous stages of the tensile testing of the multiple specimens including indicia application, pattern recording, tension observation, and post-failure analysis, the multiple specimens are observable by the one or more cameras, laser displacement sensors, and/or geometry measurement sensors as the multiple specimens are simultaneously moved through the different simultaneous stages of tensile testing when the specimen holder is rotated relative to the base structure in indexed or segment movements, whereby the tensile testing apparatus is configured to be autonomously operable for sequentially testing multiple specimens by applying a tension force to a corresponding specimen and observing and recording deformation and reaction of the multiple specimens to the tensile test via the one or more cameras, laser displacement sensors, and/or geometry measurement sensors.

21. The tensile testing apparatus of claim 1, wherein the tensile testing apparatus further comprises multiple laser displacement sensors supported on the base structure and positioned around the specimen holder to measure specimen dimensions before testing and fracture surface cross sectional area after testing.

22. The tensile testing apparatus of claim 1, wherein:
the specimen holder comprises a specimen cartridge having a circular configuration with multiple slots in the specimen cartridge;
the multiple slots are spatially arranged in a circular pattern around a periphery of the specimen cartridge;
each slot of the multiple slots has a configuration for receiving and holding a specimen in the slot such that a free end of the specimen projects from the specimen cartridge;
the actuator comprises a jaw actuator on the base structure and positioned adjacent the specimen cartridge when the specimen cartridge is removably attached to the base structure; and
the jaw actuator includes first and second jaw members operable to:
grip the free end of the specimen being held in the slot of the specimen cartridge that has been moved by rotation of the specimen cartridge into a position adjacent the first and second jaw members; and
pull the specimen in tension;
the specimen cartridge is removably attachable to the base structure thereby enabling the specimen cartridge to be removed and separated from the base structure for loading multiple specimens in to the multiple slots of the specimen cartridge and thereafter to be reattached to the base structure after the specimen cartridge has been loaded with multiple specimens in the multiple slots of the specimen cartridge;
the base structure is operable to rotate the specimen cartridge in indexed or segment movements between a number of segments of rotation that equal the number of specimens held by the specimen cartridge to thereby:
rotate the multiple specimens held in the multiple slots of the specimen cartridge toward the jaw actuator; and
sequentially position the multiple specimens held in the multiple slots of the specimen cartridge relative to the first and second jaw members at which the first and second jaw members are operable to grip and pull a corresponding specimen of the multiple specimens held in the multiple slots of the specimen cartridge as the specimen cartridge is rotated relative to the first and second jaw members;
the tensile testing apparatus further comprises one or more cameras, laser displacement sensors, and/or geometry measurement sensors supported on the base structure and positioned around the specimen cartridge for different simultaneous stages of the tensile testing of the multiple specimens including indicia application, pattern recording, tension observation, and post-failure analysis, the multiple specimens are observable by the one or more cameras, laser displacement sensors, and/or geometry measurement sensors as the multiple specimens are simultaneously moved through the different simultaneous stages of tensile testing when the specimen cartridge is rotated relative to the base structure in indexed or segment movements, whereby the tensile testing apparatus is configured to be autonomously operable for sequentially testing multiple specimens by applying a tension force to a corresponding specimen and observing and recording deformation and reaction of the multiple specimens to the tensile test via the one or more cameras, laser displacement sensors, and/or geometry measurement sensors.

* * * * *